United States Patent [19]

Janssen

[11] 4,307,959
[45] Dec. 29, 1981

[54] SETTING MECHANISM FOR AN OPTICAL SYSTEM

[75] Inventor: Willem P. H. A. Janssen, Venlo, Netherlands

[73] Assignee: Océ-Nederland B.V., Venlo, Netherlands

[21] Appl. No.: 145,313

[22] Filed: Apr. 29, 1980

[30] Foreign Application Priority Data

May 1, 1979 [NL] Netherlands ..................... 7903392

[51] Int. Cl.³ .................. G03B 27/34; G03B 27/40; G03B 27/70
[52] U.S. Cl. .................................. 355/57; 355/8
[58] Field of Search ................ 355/8, 51, 57, 65, 66, 355/11; 64/27 R, 11 P; 74/25, 27; 188/312, 321

[56] References Cited

U.S. PATENT DOCUMENTS

| | | | |
|---|---|---|---|
| 3,614,222 | 10/1971 | Post et al. | 355/8 |
| 3,918,806 | 11/1975 | Cook | 355/8 |
| 4,148,578 | 4/1979 | Bujese | 355/8 |
| 4,158,499 | 6/1979 | Hattori et al. | 355/8 |
| 4,190,349 | 2/1980 | Ohno et al. | 355/8 |

FOREIGN PATENT DOCUMENTS 2025280  12/1971  Fed. Rep. of Germany .

Primary Examiner—Richard A. Wintercorn
Attorney, Agent, or Firm—Albert C. Johnston

[57] ABSTRACT

A mechanism for setting an optical system accurately to any of various reproduction ratios comprises at least one carrier which has an optical element or elements mounted thereon and is movable along an optical axis to any selected one of several set positions corresponding to desired reproduction ratios by a buffered four-position pneumatic cylinder having oppositely extending piston rods connected respectively with the carrier and a frame part. The four-position cylinder can be adjusted to set the carrier exactly at the position required for a desired reproduction ratio without affecting the settings that provide other ratios. The carrier may be an objective carrier carrying an objective holder that can be moved relative to it in a plane perpendicular to the optical axis and is so moved as the carrier is moved between its set positions; and a movable part of the objective is adjusted at the same time. A setting mechanism comprising both an objective carrier and a related mirror carrier, each movable along the optical axis by such a four-position pneumatic cylinder to any of several set positions, is advantageous for use in copiers for producing large copies of large originals.

16 Claims, 2 Drawing Figures

SETTING MECHANISM FOR AN OPTICAL SYSTEM

This invention relates to a mechanism for setting an optical system, of a type which comprises a frame, at least one carrier for one or more optical elements, which carrier is movable along an optical axis for the purpose of setting an optical element thereon at any of various reproduction ratios, and means for moving the carrier along the optical axis.

Setting mechanisms of the type mentioned are generally used in photographic apparatus such as cameras, enlargers and copiers. The carrier of an optical element or elements usually is moved by hand or by a motor. The known setting mechanisms, however, present disadvantages when applied in copiers for producing large copies of large-size originals, such as A0, A1 or A2 sizes, because very heavy objectives and mirrors provided with robust setting devices are required in such copiers. When such heavy optical systems are moved by an electric motor, special measures are necessary for absorbing shocks and for taking up the inertia of the motor, with the result that the accuracy of the setting is jeopardized. Moreover, movement by such a motor requires particularly cumbersome provisions for cases in which such heavy systems must be settable for any of more than two reproduction ratios; for, in such a case, the optical system must be settable accurately and reproducibly to at least one intermediate position between two extreme positions.

The present invention provides a mechanism for setting an optical system, of the type above mentioned, by which the above-noted disadvantages are alleviated or overcome, and which serves well for accurately setting a heavy optical system, such as that of an electrophotographic copier for producing large copies of large originals having e.g. A0, A1 or A2 sizes.

The setting mechanism of this invention is characterized in that the means for moving the carrier along the optical axis so as to set the carried optical element(s) at selected positions corresponding to required reproduction ratios comprise a buffered four-position pneumatic cylinder having two oppositely extending piston rods one of which is connected with the carrier and the other of which is connected with the frame of the mechanism.

The occurrence of objectionable shocks is prevented in a simple way by the application of a buffered cylinder, because, with such a cylinder, at the end of every stroke of the piston a back pressure is built up which brakes the movement of the piston. Buffered cylinders are readily available commercially. A four-position pneumatic cylinder can be obtained by mounting back to back two cylinders having unequal lengths of sroke, thus enabling four positions to be provided for each carrier of an optical element. A difference in the stroke lengths can be achieved with a symmetric as well as with an asymmetric arrangement of the two cylinders. In the former case, the stroke length of either of the cylinders is shortened so as to differ from that of the other cylinder, such as by means of stops fitted on the respective piston rods. Such stops also permit the stroke length of either cylinder to be adapted to the focal length of the objective used in the optical system, which is important in order to compensate for variations within the focal length tolerance ranges of objectives that otherwise are alike.

According to another feature of the invention, the carrier for the objective is provided with an objective holder which is movable in a plane perpendicular to the optical axis, so that an objective on the holder can be moved in a direction perpendicular to the optical axis and thus can be positioned so as to maintain a fixed margin for the original and the projected image at various reproduction ratios. For this purpose, in a preferred embodiment of the invention, the objective holder is provided with a cam follower that moves in contact with a fixed cam. Further, a part of the objective can be moved relative to other parts of it, simultaneously with movement of the objective perpendicular to the optical axis, if the objective is provided with an adjusting ring having wound about it a cord the ends of which are connected with the carrier. Thus, movement of the objective causes the cord to rotate the adjusting ring, and this makes it possible, for example, to adapt a diaphragm to the selected reproduction ratio, or to move part of the objective so as to adapt the corrected state of the objective optimally to the selected reproduction ratio.

The optical element(s) mounted on the carrier need not necessarily comprise an objective, and may as well comprise one or more mirrors. For a copier having a fixed distance between the object plane and the image plane, both an objective carrier and a mirror carrier preferably are employed and are each provided with a four-position pneumatic cylinder.

The invention will be further understood from the following description and the accompanying drawings of an illustrative embodiment of the invention. In the drawings.

Figure 1:
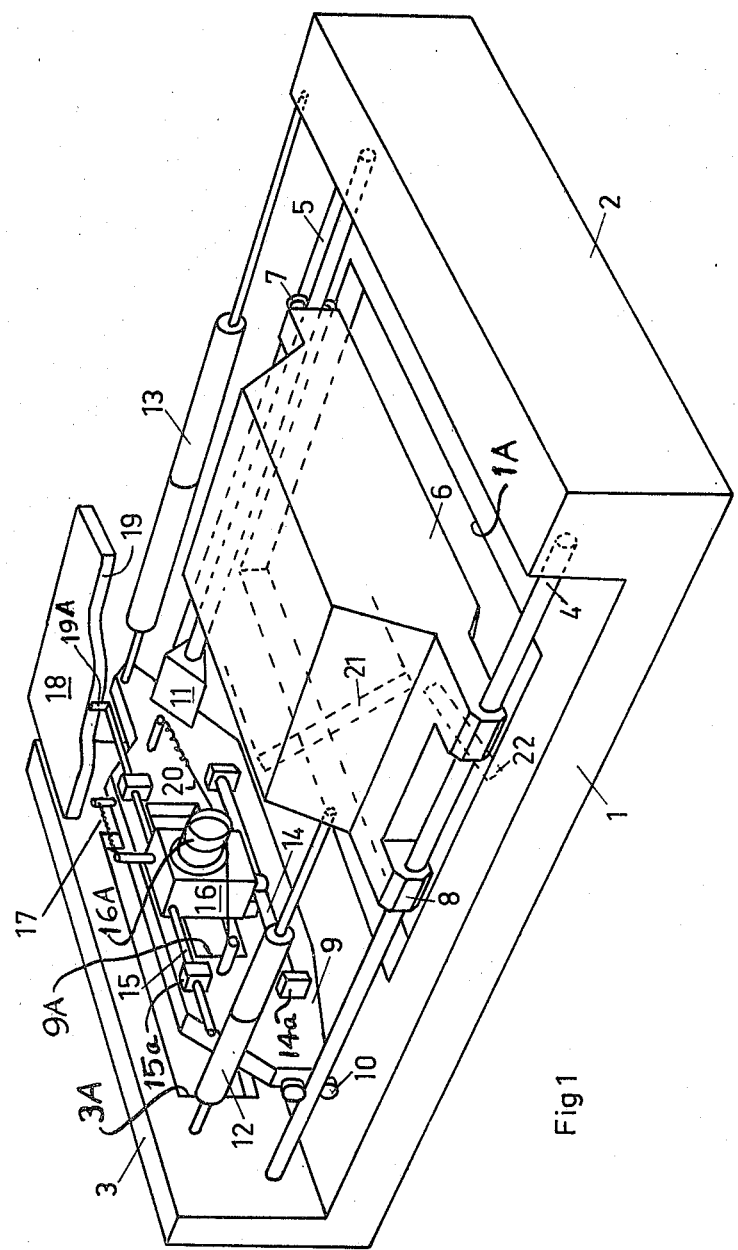
FIG. 1 is a schematic representation of a setting mechanism embodying the invention.

The setting mechanism of FIG. 1 comprises a frame consisting of a horizontally arranged rectangular base plate 1 provided with upright walls 2 and 3 at two opposite side borders of the plate. Horizontal guide rods 4 and 5 are fixed to and extend between the upright walls 2 and 3 at locations above the frame plate, near its two free side borders, and a mirror carrier 6 is mounted on these guide rods so that it can be easily moved along them. In the embodiment shown, the mirror carrier is supported on rod 5 through rotatable bearings 7 and is mounted slidable on rod 4 through axial bearing bushings 8.

An objective carrier 9, principally consisting of a plate arranged parallel to the upright walls, is also mounted on and for movement along the guide rods 4 and 5, being engaged with them through rotatable bearings 10 and an axial bearing bushing 11, respectively. The objective carrier thus is movable axially of the rods to various positions in all of which it lies between the guide rods and at the same angle to their axes.

A four-position pneumatic cylinder 12 extends between and has its piston rods connected to the upright wall 3 and the mirror carrier 6. Another four-position pneumatic cylinder 13 extends between and has its piston rods connected to upright wall 2 and the objective carrier 9. These pneumatic cylinders are operable to move the objective carrier and the mirror carrier toward each other and away from each other and further, as explained hereinafter, to maintain them in any of three different set positions corresponding to three optical reproduction ratios.

The objective carrier 9 has two horizontal rods 14 and 15 secured to it in superimposed relation. The lower rod 14 is rigidly attached to the objective carrier by end brackets 14A. The upper rod 15 is attached to the objective carrier through two coaxial bearing bushings 15a in which the rod 15 is slidable in the direction of its length. An objective holder 16 carrying an optical objective 16A is supported on and between the rods 14 and 15, being supported on the lower rod 14 through rotatable bearings and being rigidly fixed to the upper rod 15. As a result, the objective holder 16 can be moved with the rod 15 in a horizontal direction perpendicular to the direction of movement of the objective carrier 9.

A spring 17 extends between pins fixed, respectively, to the objective holder 16 and the objective carrier 9 and exerts a tension to pull the objective holder along rod 14 toward one side of the frame, for instance to the right as viewed in FIG. 1. At the same side of the frame a horizontal cam plate 18 is secured to the upright wall 3 and extends away from it so as to present a cam track 19 alongside the path of movement of the objective carrier. The rod 15 of the objective holder 16 functions as a cam follower, for which purpose it has an upturned end fitted with a roller bearing 19A that is constantly pressed against the cam track 19 by the spring 17. The cam track 19 has a stepped shape, with three stair-like steps between which it is distinctly rounded. Thus, depending upon the position of the objective carrier 9, the rod 15 and consequently the objective holder 16 can be maintained in three different positions. The highly rounded corners between the three steps assure a gradual, shock-free movement of the objective holder and minimize the accelerations and retardations which occur during its movements.

A cord 20 is wound a few times around an adjusting ring of the objective 16A and has its ends attached to the objective carrier 9 at opposite sides of the objective. By means of this cord the adjusting ring is rotated to the left or to the right, depending on the direction of movement of the objective holder 16 and objective 16A along the plane of the objective carrier 9. To prevent the cord from slipping, it is rigidly attached to the adjusting ring at one point. The rotation of the adjusting ring causes the front lens of the objective to be moved so as to adapt the objective in corrected state optimally to each available reproduction ratio. By selecting an appropriate level for the points of attachment of the cord 20 to the objective carrier, the degree of rotation of the adjusting ring during a certain movement of the objective carrier can be altered slightly and set accurately, respectively. In alternative embodiments the rotation of the ring can be effected by means of a small belt or a toothed rack, and such means can also be attached to the objective carrier at a selected level for accurately adjusting the objective.

Two mutually perpendicular mirrors 21 and 22 are mounted on the mirror carrier 6. Mirror 22 faces upward at an angle of 45° to the frame plate 1, and extends below this plate through a large rectangular opening 1A in the frame plate. Mirror 21 faces downward at an angle of 45° to the frame plate 1, and is mainly located above the frame plate. Light emanating from an object plane 23 (represented schematically in FIG. 2) passes along the bottom of frame plate 1, falls upon mirror 22, is reflected to mirror 21 in a direction perpendicular to the direction of incidence,, and is reflected by mirror 21 to the objective 16A in a direction opposite to the original beam of light. The beam of light from the objective leaves the apparatus shown in FIG. 1 through rectangular openings 9A and 3a provided in the objective carrier 9 and the upright wall 3, and is projected via an auxiliary mirror 24 onto a photoconductive surface 25 as indicated diagrammatically in FIG. 2.

Figure 2:
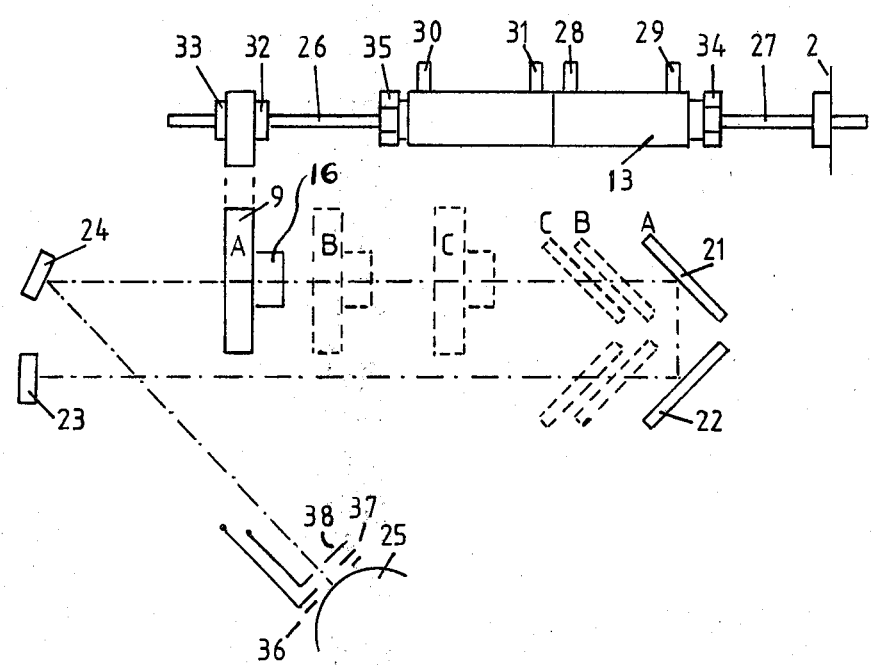
FIG. 2 is a schematic view of a four-position pneumatic cylinder with a diagram of the several available positions of an objective carrier attached to the cylinder.

The three positions of the objective carrier 9 with its objective holder 16 and objective, as well as the corresponding positions of the mirrors 21 and 22 mounted on the mirror carrier 6, are shown diagrammatically in FIG. 2 for three reproduction ratios. Position A (shown in full lines) corresponds to a reproduction ratio of 0.5, and the positions B and C (shown in broken lines) correspond to the reproduction ratios 0.7 and 1, respectively. These positions are set by means of the two four-position pneumatic cylinders 12 and 13. FIG. 2 depicts the four-position cylinder 13 of the objective carrier, the other four-position cylinder 12 being similar.

The four-position cylinder 13 comprises two air cylinders which are mounted back to back, thus providing two piston rods 26 and 27 extending oppositely from the respective air chambers. The two cylinders operate independently and are each provided with two ports 28 and 29, or 30 and 31, respectively, for compressed air connection. When the two piston rods are fully extended out of the cylinders the objective carrier is in position A. The piston rod 26 is fixed to the objective carrier 9 by extending through an opening in it and being clamped to it by nuts 32 and 33 threaded on the rod, so that the distance between the points of attachment of the two piston rods and consequently the location of the objective in position A can be set accurately by adjusting the nuts 32 and 33. This setting can also be effected, alternatively, by means of an adjusting nut or nuts connecting the outer end of the other piston rod 27 with the upright end wall 2 of the frame. When compressed air is connected to port 29 and air is vented from the port 28, the piston rod 27 will be drawn in and the objective carrier moved from position A to position B. The exact location desired at position B is obtained by setting an adjusting nut 34 which is threaded into the respective cylinder and can be turned to adjust the distance provided in the cylinder for movement of the piston therein. In the same manner, the objective carrier is moved from position B to position C when compressed air is connected to port 30 and air is vented from port 31, in consequence of which piston rod 26 will be drawn into its cylinder to an extent suited for setting the objective carrier at the location required for the reproduction ratio to be had at position C. The setting is adjusted exactly to this location, in the manner described with reference to piston rod 27 and nut 34, by means of a nut 35 threaded into the associated cylinder. The objective carrier is returned to position A from position C when compressed air is admitted to the ports 28 and 31 of the two coacting cylinders and air is vented from their other connection ports 29 and 30.

The three corresponding positions A, B and C of the mirrors 21 and 22 on the mirror carrier 6 are obtained in an entirely analogous manner by adjustments of and compressed air connections to the four-position pneumatic cylinder 12, which, being like cylinder 13, is not shown in FIG. 2.

Setting mechanisms according to the invention can be provided with other pneumatically movable elements as well as the elements described above. For example, for a copier using a slit exposure system in which the original and the photoconductive element are exposed strip by strip, a slotted diaphragm 36 is located close to the object plane, or close to the image plane at 25, and the slit width of this diaphragm can be reduced when the system is set for a smaller reproduction ratio, in order thus to maintain a constant exposure intensity. For this purpose, the slit can be narrowed on one side by sliding a plate over a part of the slit, or a second diaphragm 37 and, if desired, a third diaphragm 38 (FIG. 2) presenting successively narrower slits may be placed over the diaphragm 36. Shocks can be avoided by the use of a pneumatic cylinder for the displacement of a slit narrowing plate or of a slotted diaphragm, and especially so in copiers for copying large sizes. The length and weight of the type of diaphragm used in such copiers are quite considerable, even though the diaphragm may be of a lightweight construction composed of an aluminium frame covered with a thin, slotted sheeting.

I claim:

1. In a setting mechanism for an optical system including a frame, a carrier for at least one optical element, said carrier being mounted for movement relative to said frame along an optical axis, and means for moving said carrier therealong to any of several set positions corresponding to selected optical reproduction ratios, said means for moving said carrier comprising a buffered four-position pneumatic cylinder disposed between and having oppositely extending piston rods connected respectively with said carrier and a part of said frame.

2. A mechanism according to claim 1, said four-position cylinder comprising two air cylinders joined together back to back and having respective pistons on the respective inner ends of said piston rods, each of said air cylinders having two spaced apart ports communicating with the chamber thereof for connection alternately with a supply of compressed air to move the piston of the cylinder back or forth in said chamber.

3. A mechanism according to claim 2, at least one of said air cylinders having thereon adjustable stop means for setting the stroke distance of its piston exactly to that required for one of said reproduction ratios.

4. A mechanism according to claim 1, 2 or 3, at least one of said piston rods being connected with said carrier or said frame part, respectively, by means which are adjustable to set the effective length of said four-position cylinder exactly to that required for one of said reproduction ratios.

5. A mechanism according to claim 1, 2 or 3, said carrier having an objective holder mounted thereon for movement relative thereto in a plane perpendicular to said optical axis, and means for moving said objective holder a certain distance in said plane as said carrier is moved along said axis from one to another of said set positions.

6. A mechanism according to claim 5, said means for moving said objective holder including a cam follower connected with said holder for movement therewith and a cam track fixed along said frame, said track being engaged by and positioning said follower.

7. A mechanism according to claim 5, said objective holder carrying an objective provided with a ring that is turnable for adjusting a movable part of the objective, and means operated by movement of said holder relative to said carrier for turning said ring to adjust said movable part.

8. A mechanism according to claim 7, said means for turning said ring comprising a cord wound about said ring and extending from it to points of attachment to said carrier at opposite sides of said ring.

9. A mechanism according to claim 1, 2 or 3, said carrier being a mirror carrier having a mirror mounted thereon across said optical axis.

10. A mechanism according to claim 9, said mirror facing downward at an angle of 45° to said axis, said carrier also having a second mirror mounted thereon below and at an angle of 90° to the first mentioned mirror so that a beam in a path beneath and parallel to said axis is reflected along said axis by said mirrors.

11. A mechanism according to claim 10, said frame comprising a base having an opening therethrough over which said carrier is movable along said axis, said second mirror extending downward from said carrier through and below said opening.

12. A setting mechanism for an optical system, comprising a frame having a base and upright side walls at opposite borders of said base;

an opening in one of said walls for passing a light beam from an objective disposed over said base;

an objective carrier mounted over said base for movement along an optical axis to any of several set positions corresponding to selected optical reproduction ratios;

said carrier having an objective holder mounted thereon for movement relative thereto in a plane perpendicular to said axis, said holder carrying an objective provided with a ring that is turnable for adjusting a movable part of the objective;

means including a four-position pneumatic cylinder disposed between and having oppositely extending piston rods connected respectively with said objective carrier and the other of said side walls for moving said carrier to any selected one of said positions;

means for moving said objective holder a certain distance in said plane as said carrier is moved along said axis from one to another of said set positions, and means operated by movement of said holder relative to said carrier for turning said ring to adjust said movable part;

a mirror carrier mounted over said base for movement along said axis, said mirror carrier carrying a first mirror disposed across said axis and facing downward at an angle of 45° to said axis and a second mirror disposed below and at an angle of 90° to said first mirror, said second mirror extending downward through and below an opening in said base so that a beam in a path beneath and parallel to said base is reflected along said axis to said objective by said mirrors;

and means including a second four-position pneumatic cylinder disposed between and having oppositely extending piston rods connected respectively with said mirror carrier and said one side wall for moving said mirror carrier along said axis to any one of several set positions each of which is correctly related to the optical reproduction ratio at one of said positions of said objective carrier.

13. A mechanism according to claim 12, each of said four-position cylinders comprising two air cylinders joined together back to back and having respective pistons on the respective inner ends of their piston rods, each of said air cylinders having two spaced apart ports communicating with the chamber thereof for connection alternately with a supply of compressed air to move the piston of the cylinder back or forth in said chamber.

14. A mechanism according to claim 12 or 13, each of said air cylinders having thereon adjustable stop means for setting the stroke distance of its piston exactly to that required for one of said reproduction ratios;

at least one of the said piston rods of each of said four-position cylinders being connected with the related carrier or the related frame side wall, respectively, by means which are adjustable to set the effective length of such four-position cylinder exactly to that required for one of said reproduction ratios.

15. A mechanism according to claim 14, said means for moving said objective holder including a cam follower connected with said holder for movement therewith and a cam track fixed along said frame, said track being engaged by and positioning said follower.

16. A mechanism according to claim 15, said means for turning said ring comprising a cord wound about said ring and extending from it to points of attachment to said objective carrier at opposite sides of said ring.

* * * * *